July 17, 1956
J. B. ARMITAGE
2,755,117
MACHINE TOOL SPINDLES
Filed June 25, 1951
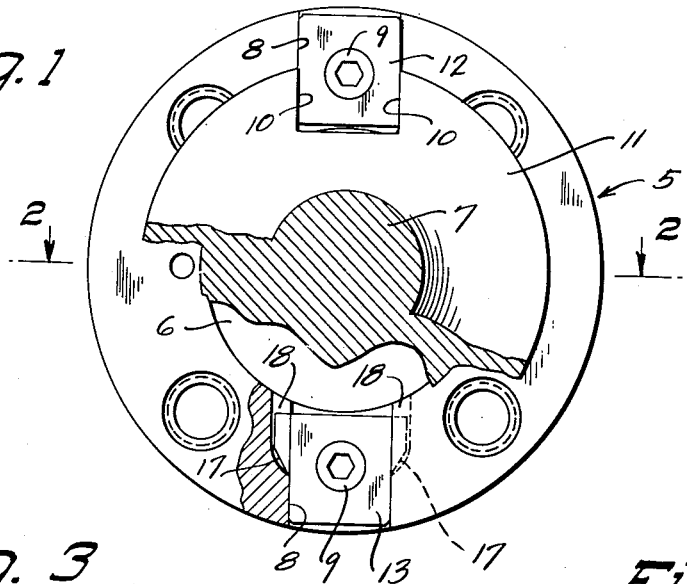
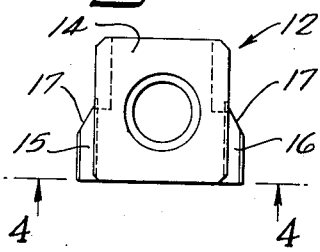
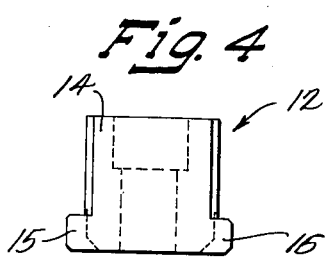
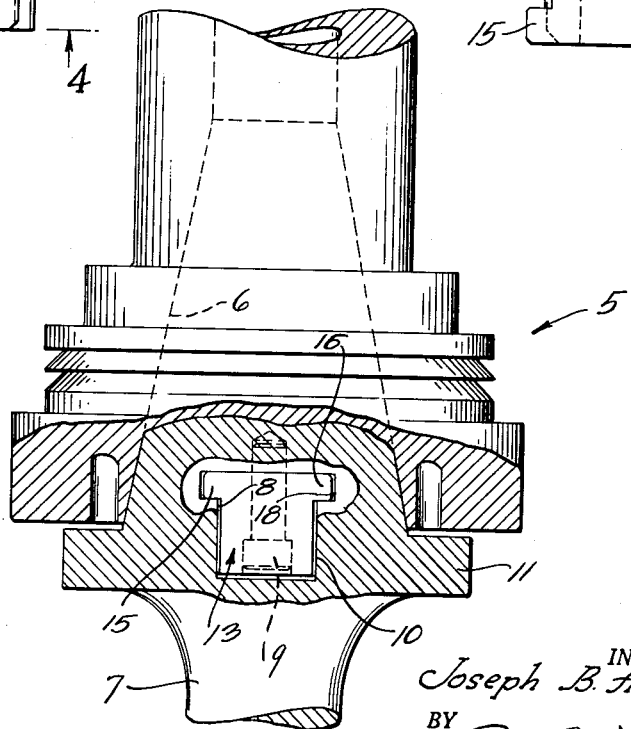
INVENTOR.
Joseph B. Armitage
BY
Attorney United States Patent Office 2,755,117
Patented July 17, 1956

2,755,117

MACHINE TOOL SPINDLES

Joseph B. Armitage, Wauwatosa, Wis., assignor to Kearney & Trecker Corporation, West Allis, Wis., a corporation of Wisconsin Application June 25, 1951, Serial No. 233,476

8 Claims. (Cl. 287—119)

This invention relates generally to improvements in machine tool spindles and more particularly to an improved spindle nose drive key assembly.

The principal object of this invention is to provide an improved means for rigidly mounting a drive key in a machine tool spindle.

Another object is to provide an improved machine tool spindle with drive keys securely mounted thereon.

Another object of the invention is to provide an improved spindle nose drive key having extending flanges designed to lock the key in position regardless of the rate of rotation of the spindle.

Still another object is to provide a machine tool spindle having locking slots joining with the drive key slot disposed to receive an improved type drive key.

Another object of the invention is to provide an improved machine tool spindle and drive key designed to assure greater locking tendencies with increased rates of spindle rotation.

Still another object is to provide an improved spindle nose drive key having extending flanges to secure the key even though the retaining screw is loosened or broken during rotation of the spindle.

Yet another object of the invention is to provide an improved spindle nose drive key particularly disposed for use in high speed spindles.

Another object of the invention is to provide an improved spindle nose having drive keys wedgedly locked in position against all radial movement.

According to the invention, an improved machine tool spindle has been provided in which the conventional drive blocks or keys have been redesigned to include extending flanges which are securely fitted in corresponding slots machined in the sides of the drive block slot of the spindle. Both of the drive keys are provided with integrally formed flanges of identical shape having a tapered forward edge. The flanges are designed for a precise fit in the extending slots which originate on the internal peripheral edge of the spindle nose. Heretofore, the driving keys have been securely locked in a driving slot on the front face of the spindle by means of a screw. Such an arrangement was satisfactory when the spindle was driven at conventional speeds. With the advent of machine tool spindles being driven in the higher speed ranges, it was necessary to design a driving key which could not possibly become loosened from the spindle even though the locking screw was broken or loosened. The improved driving key assembly herein disclosed afforded such advantages regardless of the centrifugal force created by the rapidly rotating spindle.

The foregoing and other objects of the invention which will become more fully apparent from the following detailed description of the spindle driving apparatus exemplifying the invention, may be achieved by the structure described herein as a preferred embodiment thereof in connection with the accompanying drawings, in which:

Figure 1 is a front elevation of a machine tool spindle depicting the improved drive keys mounted therein and engaging a cutter arbor, with said structure embodying the invention;

Fig. 2 is a view partly in plan and partly in section taken substantially along the plane represented by line 2—2 in Fig. 1, with a portion of the section broken away to show the arbor retaining key in its associated slot;

Fig. 3 is a top plan view of the spindle drive key enlarged to show the structural details thereof; and, Fig. 4 is an end view of the spindle drive key shown in Fig. 3 and taken on the plane of line 4—4 thereof.

Referring more specifically to the drawings and particularly to Figs. 1 and 2 thereof, a standard type machine tool spindle 5 is shown with a tapered bore 6 disposed to receive an arbor 7 in a manner well known in the machine tool art. The arbor 7 may be one of many well known types disposed to retain a machine tool cutter (not shown). The arbor is locked in position for unitary rotation with the power driven spindle 5 of a machine tool, as more particularly described in Patent No. 1,794,361, dated March 3, 1931.

Heretofore, standard machine tool spindle construction provided for the retention of a pair of drive keys in a diametrical slot 8 extending on each side of the tapered spindle bore 6; the keys were locked in position by means of screws 9 threadedly retained in the spindle. The drive keys remained rigidly fixed at all speeds at which spindles were customarily driven in effecting a cutting operation. A slot 10 in the extending flange 11 of the tool retaining arbor 7 served to provide contact engagement with each side of the driving keys. Thus, the arbor was securely retained through engagement with the tapered surface of the spindle 5 and with each of the driving keys fixedly carried by the spindle.

The invention hereinafter detailedly described is directed to a vastly improved drive key for a machine tool spindle and is particularly adapted for machine tools of the high speed type. With the increased use of non-ferrous alloys throughout industry which need to be machined to precise tolerances, it has been found expedient to greatly increase the speed of the cutters in machine tools used to machine the same. Consequently, the spindles of such machine tools need to be driven in exceptionally high speed ranges. In these speed ranges, a heretofore relatively unimportant factor, namely, the greatly increased centrifugal forces created in the spindle and its associated parts, has become of extreme importance. Thus, it became necessary to actually carefully analyze the effects of such forces on the spindle and its component parts.

The drive keys, as conventionally mounted in the diametrical slot 8 on a machine tool spindle 5 in the manner heretofore described, were found to be extremely vulnerable to the effects of the centrifugal forces created in the high speed ranges. Although the driving keys heretofore used were securely retained in the slot 8 by means of a screw 9 threadedly mounted in the spindle 5, it became necessary to consider the possibility of an accident in the event one of the screws would shear off while the spindle was being driven at high speed. In such an event, the drive keys would be centrifugally driven out of the slot 8 with such an extreme force that the injury to the machine operator or to adjoining property could be substantial; or considerable damage could result to the machine tool and work-piece on which the driving keys were mounted.

Each of a pair of driving keys 12 and 13 is comprised of a parallelepiped formed block 14 integrally machined with a pair of extending flange portions 15 and 16, as detailedly shown in Figs. 3 and 4. Both flanges are extensively formed on opposite sides of the block 14 and are provided with a tapered end 17 at the approximate midsection thereof. In addition, the two bottom side edges, as well as the top corner edges, as viewed in Figs. 3 and 4, are chamfered to break the sharp contact edge of the block 14.

As shown in Figs. 1 and 2, an extending slot 18 is provided at the bottom sides of the driving slot 8 in the spindle 5. The side slots 18 originate at the periphery of the tapered portion 6 and extend outwardly in alignment with the driving slots 8, as clearly indicated in Fig. 1. These slots do not extend along the entire length of the drive slot 8 but rather, are terminated with a radius slightly beyond the midpoint of the driving slot.

The improved type drive keys 12 and 13 are inserted from the inner end of the driving slot 8. The extending flange portions 15 and 16 thereof are precision machined to a size corresponding to the width and depth of the extending slots 18 in the spindle driving slot 8. The length of the flange portion including the tapered end 17 is slightly less than the length of the extending side slots 18 in the spindle 5. Thus, when the drive keys are properly positioned in the drive slot 8, the forward movement thereof is blocked by the meeting of the tapered end portion 17 of the drive keys or blocks with the rounded end of the extending slots 18 in the spindle 5, as clearly shown in Fig. 1. When the drive keys are locked in position by tightening the screws 9, the bottom face of the drive blocks are brought into full engagement with the bottom of the slot 8 and serve to provide an increased contact surface between the drive keys and the spindle 5.

The arrangement herein disclosed is such that during high speed milling operations the drive blocks are constantly maintained in a precise position in the spindle. If during the high speed rotation of the spindle, the screws 9 should become loose or broken, the centrifugal force normally created could not be imparted to the driving blocks to force them out of the driving slot 8. Instead, the block is forced slightly outwardly in the drive slot until the tapered end portion 17 of the drive key abutted with the rounded end of the extending slots 18 in the spindle 5. Thereafter, the drive block could not be moved any further outwardly in a radial plane, but rather, would be securely retained in position regardless of the speed of the cutter spindle. The drive blocks continue to serve their normal purpose, namely to engage the sides of a pair of oppositely disposed slots 10 in the arbor 7 and thereby lock the arbor for unitary rotation with the spindle. With the arbor 7 securely mounted in the spindle in a well known manner, it is impossible to remove the drive blocks 12 and 13 therefrom, since the arbor 7 would serve to prevent the inwardly withdrawal or movement of the drive blocks 12 and 13 from their respective drive slots 8.

Thus, it should be apparent to one skilled in the art that the drive keys 12 and 13 are securely mounted in the spindle 5 and will remain so regardless of the rotative speed of the spindle. This arrangement provides a safety feature whereby the drive blocks could not possibly be centrifugally forced from the spindle during the excessively high speed rates which are presently used in machining nonferrous metals, such as aluminum and magnesium. For example, the vastly improved carbide tipped cutters presently available require cutting speeds in the range of ten thousand revolutions per minute. At this speed, the machine parts must be carefully designed to eliminate any possibility of failure due to the increased centrifugal forces created during such speeds.

The particular arrangement disclosed herein could likewise be readily adapted in securing other parts which are subjected to similar forces during high speed machining operations. Such an adaptation could be made by anyone skilled in the art through the utilization of the principles herein set forth without departing from the spirit and scope of the invention as defined in the subjoined claims.

The principles of the invention having now been fully explained in connection with the foregoing description of illustrative embodying apparatus, my invention is hereby claimed as follows:

1. In a rotatable spindle having an axial bore for receiving a tool, an arcuate extension concentrically fixed to the tool receiving end of said spindle, a second arcuate extension concentrically fixed to the end of said spindle diametrically opposite said first arcuate extension and spaced therefrom to form a pair of diametrically opposed driving slots between the adjacent ends of said extensions, the ends of said arcuate extensions being undercut to form a pair of extending slots extending laterally from each of said driving slots, a drive key disposed within each of said driving slots for preventing rotational movement of the tool with respect to the spindle, and a pair of flanges extending laterally from each of said drive keys for reception within said extending slots, whereby said flanges within said extending slots serve to secure the drive keys within their respective drive slots.

2. In a rotatable spindle having an axial bore for receiving a tool, an arcuate extension concentrically fixed to the tool receiving end of said spindle, a second arcuate extension concentrically fixed to the tool receiving end of said spindle and spaced from the first arcuate extension to form a pair of driving slots between the adjacent ends of said extensions, the ends of said arcuate extensions being undercut to form a pair of extending slots extending laterally from each of said driving slots, a drive key disposed within each of said driving slots for preventing rotational movement of the tool relative to the spindle, and a pair of flanges extending laterally from each of said drive keys for reception within said extending slots, whereby said flanges within said extending slots serve to secure the drive keys within their respective drive slots.

3. In a rotatable spindle having an axial bore for receiving a tool, an arcuate extension concentrically fixed to the end of said spindle, a second arcuate extension concentrically fixed to the end of said spindle diametrically opposite said first arcuate extension and spaced therefrom to form a pair of diametrically opposed driving slots between the adjacent ends of said extensions, the ends of said arcuate extensions being undercut to form a pair of extending slots extending laterally from each of said driving slots and longitudinally from the periphery of said axial bore partially to the periphery of said spindle so that they are accessible only from said bore, a drive key disposed within each of said driving slots for preventing rotational movement of the tool with respect to the spindle, and a pair of flanges extending laterally from each of said drive keys for reception within said extending slots, whereby said flanges within said extending slots serve to secure the drive keys within their respective drive slots and render the drive keys irremovable while a tool is operatively positioned in the spindle bore by reason of the extending slots being inaccessible except from the axial bore of the spindle.

4. In a rotatable spindle having an axial bore for receiving a tool, a peripheral flange fixed to the end of said spindle about said bore, said flange having a plurality of driving slots with a pair of extending slots extending laterally from each of said driving slots, a drive key disposed within each of said driving slots for preventing rotational movement of the tool relative to the spindle, and a pair of flanges extending laterally from each of said drive keys for reception within said extending slots, whereby said drive key flanges within said extending slots serve to secure the drive keys within their respective drive slots.

5. In a rotatable spindle having an axial bore for receiving a tool, a peripheral flange formed at the end of said spindle about said bore, said flange having a plurality of driving slots with a pair of extending slots extending laterally from each of said driving slots and longitudinally from the periphery of said axial bore partially to the periphery of said flange so that they are accessible only from said bore, a drive key disposed within each of said driving slots for preventing rotational movement of the tool relative to the spindle, and a pair of flanges extending laterally from each of said drive keys for reception within said extending slots, whereby said drive key flanges within said extending slots serve to secure the drive keys within their respective drive slots and render the drive keys irremovable while a tool is operatively positioned in the spindle bore by reason of the extending slots, being inaccessible except from the axial bore of the spindle.

6. In a rotatable spindle having an axial bore for receiving a tool, an arcuate extension concentrically fixed to the tool receiving end of said spindle, a second arcuate extension concentrically fixed to the tool receiving end of said spindle and spaced from the first arcuate extension to form a pair of driving slots between the adjacent ends of said arcuate extensions the ends of said arcuate extensions being undercut to form a pair of extending slots extending laterally from each of said driving slots, a drive key disposed within each of said driving slots for preventing rotational movement of the tool relative to the spindle, a pair of flanges extending laterally from each of said drive keys for reception within said extending slots, and securing means operatively connected to secure the drive keys in their respective driving slots, whereby the flanges within the extending slots cooperate with the securing means to securely retain the drive keys in position in their associated driving slots.

7. In a rotatable spindle having an axial bore for receiving a tool, a peripheral flange formed at the end of said spindle about said bore, said flange having a plurality of driving slots with a pair of extending slots extending laterally from each of said driving slots and longitudinally from the periphery of said axial bore partially to the periphery of said flange so that they are accessible only from said bore, a drive key disposed within each of said driving slots for preventing rotational movement of the tool relative to the spindle, a pair of flanges extending laterally from each of said drive keys for reception within said extending slots, and securing means operatively connected to secure the drive keys within their respective slots, whereby upon a failure of the securing means the drive key flanges within the extending slots preclude dislodgment of the drive keys from their respective slots while a tool is in operating position, occupying the axial bore of the spindle.

8. In a rotatable spindle having an axial bore for receiving a tool, a peripheral flange formed at the end of said spindle about said bore, said flange having a plurality of driving slots, a drive key disposed within each of said driving slots for preventing rotational movement of the tool relative to the spindle, securing means operatively connected to secure the drive keys within their respective driving slots, and supplemental locking means operatively connected to preclude removal of said drive keys except by movement into said axial bore, whereby upon a failure of the securing means the supplemental locking means precludes dislodgment of the drive keys from their respective slots while a tool is in operating position, occupying the axial bore of the spindle.

References Cited in the file of this patent

UNITED STATES PATENTS

| | | |
|---|---|---|
| 657,256 | Tipton | Sept. 4, 1900 |
| 872,883 | Adams | Dec. 3, 1907 |
| 1,091,447 | Wagner | Mar. 24, 1914 |
| 1,269,075 | Grabill | June 11, 1918 |
| 1,300,163 | Groene | Apr. 8, 1919 |
| 1,632,386 | Waters | June 14, 1927 |
| 1,794,361 | Armitage et al. | Mar. 3, 1931 |
| 1,940,455 | Kilpela | Dec. 19, 1933 |
| 2,189,604 | Healy | Feb. 6, 1940 |
| 2,433,127 | Kinzbach | Dec. 23, 1947 |
| 2,474,360 | Jimerson | June 28, 1949 |
| 2,501,421 | Stephan | Mar. 21, 1950 |